United States Patent [19]
Holder

[11] Patent Number: 5,694,966
[45] Date of Patent: Dec. 9, 1997

[54] FLOW RESPONSIVE PRESSURE REGULATING UNLOADER

[75] Inventor: Donald Holder, Toledo, Ohio

[73] Assignee: Giant Industries, Inc., Toledo, Ohio

[21] Appl. No.: 496,399

[22] Filed: Jun. 29, 1995

[51] Int. Cl.⁶ .................................................. G05D 7/01
[52] U.S. Cl. .................. 137/115.11; 137/11.13; 137/115.26; 137/599
[58] Field of Search ............... 137/115.06, 115.09, 137/115.11 I, 115.13, 115.26, 599

[56] References Cited

U.S. PATENT DOCUMENTS

| | | | |
|---|---|---|---|
| 1,934,758 | 11/1933 | Temple | 137/115.06 |
| 2,665,704 | 1/1954 | Kanuch | 137/115.09 X |
| 2,895,665 | 7/1959 | McSweeney | 137/115.26 |
| 3,524,465 | 8/1970 | Sadler | 137/115.06 |
| 3,665,950 | 5/1972 | Nelson | 137/115.11 X |
| 3,915,186 | 10/1975 | Thomas | 137/115.06 X |
| 3,948,147 | 4/1976 | Sauer et al. | 137/115.06 X |
| 4,559,964 | 12/1985 | Yamaguchi et al. | 137/599 X |

OTHER PUBLICATIONS

Undated cross sectional drawing of a prior art commercial flow actuated unloader valve.
Undated cross sectional drawing of a prior art commrcial pressure regulating unloader valve.

*Primary Examiner*—Stephen M. Hepperle
*Attorney, Agent, or Firm*—MacMillan, Sobanski & Todd

[57] ABSTRACT

A flow responsive pressure regulating unloader suitable for use between a positive displacement fluid pump and a fluid consuming device connected to the pump. The unloader includes a housing having an inlet port connected to an outlet port, and a by-pass port. A fluid pressure regulating valve is connected between the inlet port and the by-pass port to limit the maximum fluid pressure at the inlet port. A flow responsive valve also is connected between the inlet port and the by-pass port. Fluid flow from the inlet port to the outlet port creates a pressure drop across an orifice. The pressure differential is applied across a piston to close the flow responsive valve. When flow from the outlet ceases, the pressures across the piston become equal and the fluid pressure on the flow responsive valve opens the valve to divert fluid to the by-pass port.

9 Claims, 1 Drawing Sheet

FLOW RESPONSIVE PRESSURE REGULATING UNLOADER

TECHNICAL FIELD

The invention relates to pressure unloaders and more particularly to a flow responsive pressure regulating unloader suitable for regulating liquid pressure from a pump and for unloading both pressure at a high pressure liquid inlet port connected to a positive displacement liquid pump and pressure at a liquid outlet port when liquid flow from the outlet port is interrupted.

BACKGROUND ART

Positive displacement pumps are often used for delivering fluid at a high pressure. For example, positive displacement pumps may be used to deliver water at pressures of from 1,000 psi to 4,000 psi or more for pressure washers and for industrial applications such as cleaning castings. It will be appreciated that water and other pumped fluids are incompressible. Consequently, either the pump must be stopped or the pump output must be unloaded when the liquid discharge passage is closed, as when a washer gun is shut off.

Two types of unloaders have commonly been used for unloading pressure and or flow on positive displacement liquid pumps: pressure responsive unloaders and flow responsive unloaders. The unloader is located between the pump and a line or hose connected to a device to which the high pressure liquid is delivered. The pressure responsive unloaders generally includes a piston which is moved by the liquid pressure against the force of a compression spring. The spring force is adjusted to set the liquid pressure at which the piston moves. When the pressure is sufficient to move the piston, a valve is opened and the excess liquid pressure is dumped to a by-pass port and returned to the pump inlet or to a tank. When the liquid outlet port is connected to a triggered washer gun, for example, the piston moves against the spring only when the liquid pressure exceeds the pressure set by the spring. The piston moves to open the unloader valve only to the extent necessary to reduce the pressure to the set pressure. Thus, the pressure valve acts as a pressure regulator.

When liquid flow to the washer gun is stopped by closing a trigger valve on the gun, the valve opens to return all of the liquid flow through the by-pass port to the pump inlet or to a tank. It will be apparent that the liquid passages from the valve and in the hose from the valve to the washer gun will be maintained at the set pressure when the washer gun is turned off with a pressure responsive unloader valve. When the washer gun is turned off, the trapped water pressure at the gun and in the hose between the unloader and the gun is typically 20% to 30% higher than the operating pressure. Some product safety agencies have expressed concerns regarding maintaining the liquid hose at a high pressure while the washer gun is turned off. Pressure responsive unloaders are considered very reliable when compared to flow responsive unloaders.

Prior art flow responsive unloaders also include a pressure regulator. These unloaders also will dump excess fluid pressure to a by-pass port for returning the fluid to the pump inlet when the fluid outlet port is closed. The flow actuated unloader works with a venturi that lowers the pressure on the top of a piston. Fluid flow moves the piston to close off a by-pass valve and increases the pressure. The piston works against a spring that limits the amount of pressure being generated. One of the problems associated with the prior art flow responsive unloader is the piston must work against the spring when in the by-pass mode, which typically creates approximately 200 psi of by-pass pressure on the pump. The by-pass pressure causes heat to build up in the by-pass loop. Another problem is that the piston wears after a period of time and eventually liquid leaks around the piston, destroying the action of the venturi. This prevents the unloader valve from coming up to pressure and renders the unloader valve useless. Although unreliable, the prior art flow responsive unloader valves are quite safe, since there is no trapped pressure at the outlet port when the flow is off. Further, as the piston begins to wear through use, the flow responsive unloader fails by dumping a greater amount of liquid to the by-pass rather than to the output hose.

There is a need for an unloader for use with a positive displacement liquid pump which has the reliability of prior art pressure responsive unloaders and the safety of the flow responsive unloaders.

DISCLOSURE OF INVENTION

The invention is directed to a reliable pressure regulating unloader which has the operational benefits of both flow responsive and pressure responsive unloaders and is suitable for use, for example, in a high pressure power washer of the type having a positive displacement pump. The unloader includes two components, a liquid pressure regulator and a flow responsive unloader. Liquid enters a first chamber in the unloader through an inlet port which receives pressurized liquid from a pump. The first chamber connects through a second chamber in a first cylinder, an orifice and a venturi to an outlet port. The pressure regulator includes a pressure relief valve having a ball and seat in the first chamber. Normally, a spring urges the ball against the seat to prevent liquid flow through the pressure relief valve to a by-pass or dump port. A first piston slides in and divides a second cylinder into third and fourth chambers. The pressure relief valve connects through the third chamber to the by-pass port which is connected to return by-pass liquid to an inlet to the pump. The first piston is mounted in the second cylinder to move towards the ball against the action of an adjustable spring pressure. A passage connects the fourth chamber to receive liquid pressure from the unloader inlet port. When the liquid pressure action on the piston is sufficient to overcome the set spring pressure, the piston moves to unseat the ball. When the ball is unseated, liquid flows from the first chamber through the pressure relief valve and then through the third chamber to the by-pass port. The spring pressure is adjusted to set a desired liquid pressure in the first chamber and hence to regulate the liquid pressure applied to the unloader outlet port.

A second piston divides the first cylinder into the first chamber and a fifth chamber. A rod connected to a first side of the second piston connects to a by-pass valve which is located between the second chamber and the by-pass port. The second piston is free to slide in the first chamber and is positioned solely by liquid pressure differentials on opposite sides of the piston and on the by-pass valve. A passage is connected from between the orifice and the venturi to the fifth chamber. When the water discharge gun is triggered and there is flow from the unloader inlet port to the unloader outlet port, the liquid flow through the orifice creates a sufficient reduced pressure in the fifth chamber to hold the by-pass valve closed. When the gun trigger is released and liquid flow from the outlet port ceases, the pressure in the fifth chamber rapidly increases to the same pressure as in the second chamber, thus balancing the pressures on opposite sides of the second piston. However, the liquid pressure also acts on the area of the by-pass valve with sufficient force to move the second piston and thus open the by-pass valve. The open by-pass valve dumps liquid from the first chamber to the by-pass port. While the by-pass valve remains open, a very low pressure will remain in the second chamber until liquid flow at the unloader outlet is reestablished. When liquid flow is reestablished, unbalanced pressures on the second piston will close the by-pass valve and the liquid at the outlet port quickly returns to the set pressure.

Accordingly, it is an object of the invention to provide an improved flow actuated fluid pressure unloader which regulates the fluid pressure.

Other objects and advantages of the invention will become apparent from the following detailed description of the invention and the accompanying drawings.

BEST MODE FOR CARRYING OUT THE INVENTION

Figure 1:
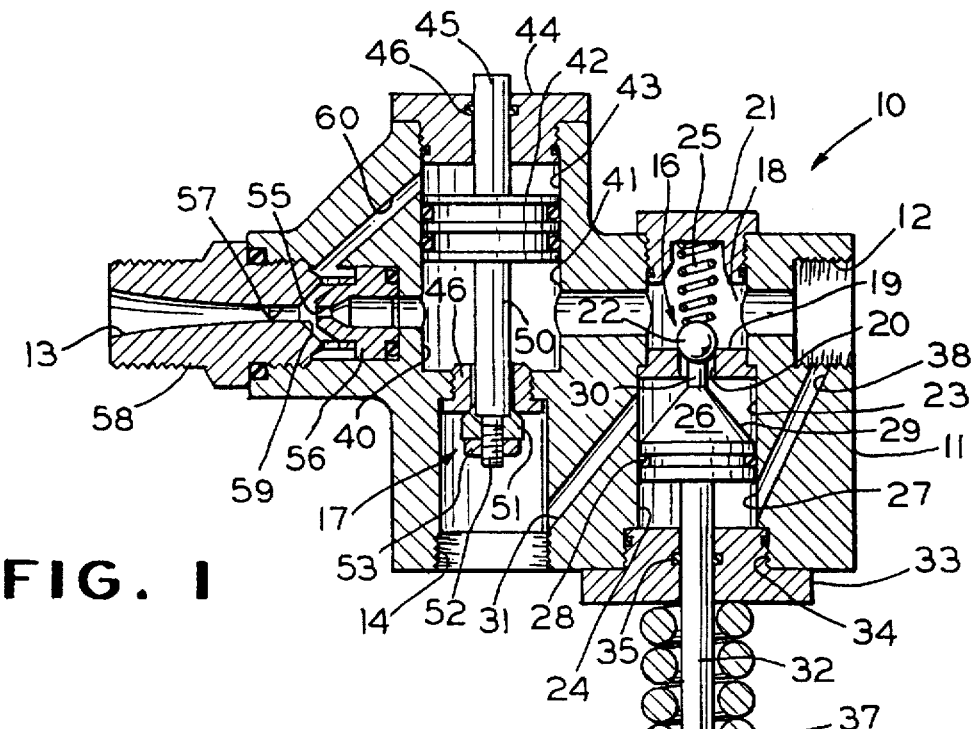
FIG. 1 is a cross sectional view through a flow actuated pressure regulating unloader showing the valves in the unloader in the position where there is fluid flow at the outlet port.
Figure 2:
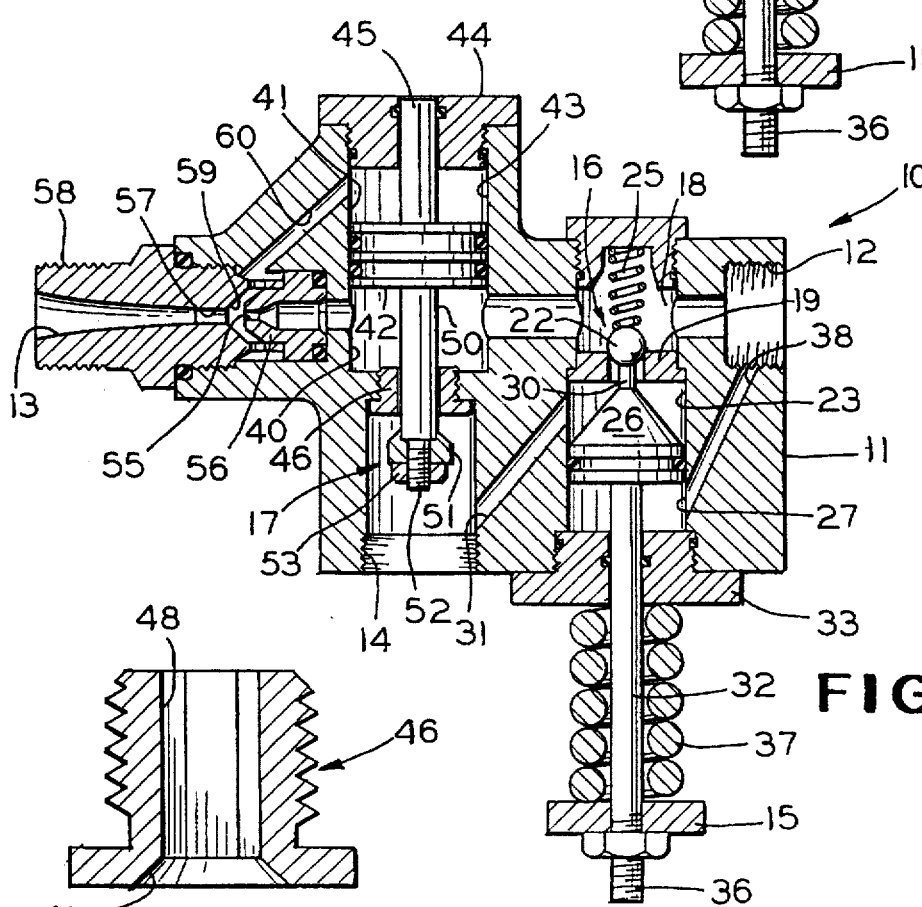
FIG. 2 is a cross sectional view through the unloader of FIG. 1, but showing the by-pass valve in the position when there is no fluid flow at the outlet port.

Referring to FIGS. 1 and 2 of the drawings, an unloader 10 is shown according to the invention. The unloader 10 has a housing 11 having a pressurized liquid inlet port 12 for connection to a pump (not shown), a liquid outlet port 13 for connection to a device (not shown) which selectively receives a flow of pressurized liquid and a by-pass port 14. The inlet port 12 and the by-pass port 14 are illustrated as threaded openings and the outlet port 13 is illustrated as having external threads for attachment to complementary threaded hose fittings (not shown). If, for example, the unloader 10 is used in a power washer in which a high pressure positive displacement pump supplies pressurized water to a conventional washer gun or wand (not shown) having a trigger, all of the water delivered to the inlet port 12 normally will flow to the outlet port 13 when the washer gun or wand is triggered on.

The unloader 10 also includes a pressure adjusting knob 15. Adjustment of the knob 15 sets the maximum water pressure delivered to the washer gun or wand. If the pump output pressure exceeds the set pressure, excessive water flow is diverted by a pressure responsive valve 16 to the by-pass port 14. A flow responsive valve 17 also is mounted in the housing 11. When flow to the washer gun or wand ceases, the flow responsive valve 17 dumps the water flow to the by-pass port 14 and relieves nearly all pressure at the outlet port 13 and on a hose (not shown) connected from the outlet port 13 to the washer gun, wand or other attached device. Liquid dumped to the by-pass port 14 may be returned to the inlet to the pump and recirculated until liquid flow through the outlet port is reestablished. A very low pressure will remain at the outlet port 13 while there is no fluid flow through the outlet port 13. This low pressure causes fluid to flow through the outlet port 13 when the attached device is re-triggered. When flow at the outlet port 13 is reestablished, the flow responsive valve 17 quickly closes and the high pressure returns to the outlet port 13.

The inlet port 12 connects to a chamber 18 in the housing 11. The chamber 18 is closed at one end by an insert 19 having an orifice 20. An opposite end of the chamber 18 is closed by a plug 21 which is threaded into the housing 11. If desired, the insert 19 may be an integral part of the housing 11, or it may be threaded into the housing 11 to permit replacement in the event that the orifice 20 wears through erosion. The insert 19 defines a valve seat for a valve member such as a ball 22 which is located in the chamber 18. The ball 22 is normally seated over and closes the orifice 20 to prevent fluid flow from the chamber 18 to a chamber 23 in a cylinder 24. A compression spring 25 is positioned between the plug 21 and the ball 22 to urge the ball 22 to seat against the insert 19. The insert 19 and the ball 22 form a part of the pressure responsive valve 16.

A piston 26 is mounted to slide in the cylinder 24. The piston 26 separates the chamber 23 from a chamber 27. The piston 26 carries a seal 28 for preventing liquid leakage between the chambers 23 and 27 as the piston 26 slides in the cylinder 24. In the chamber 23, the piston 26 has a conical end 29 which terminates at a rod 30. The rod 30 is aligned with and extends into the orifice 20. When the piston 26 is moved sufficiently towards the insert 19, the rod 30 pushes the ball 22 away from the insert 19 to open the pressure regulating valve 16. Pressurized liquid in the chamber 18 will then flow through the orifice 20, the chamber 23 and a passage 31 to the by-pass port 14. The amount of liquid flowing from the chamber 18 to the by-pass port 14 will be a function of the extent that the ball 22 is unseated, which in turn is a function of the position of the piston 26.

A rod 32 extends from the piston 26 through a plug 33 which is threaded into an end 34 of the cylinder 24. A seal 35 prevents liquid leakage between the rod 32 and the plug 33 while permitting the rod 32 to slide in the plug 33. The rod 32 has a threaded free end 36. The pressure adjusting knob 15 is threaded onto the rod end 36 and a compression spring 37 is compressed between the knob 15 and the plug 33. The compression spring 37 pulls on the rod 32 to urge the piston 26 away from the insert 19 to allow the ball 22 to seat on the insert 19, closing the valve 16. The amount of force exerted by the spring 37 on the rod 32 will be a function of how much the spring 37 is compressed. Consequently, the force required to move the piston 26 can be adjusted by tightening or loosening the knob 15.

The chambers 27 and 29 are located on opposite sides of the piston 26. As previously stated, the chamber 29 is connected to the by-pass port 14 and consequently the chamber 29 will not be subjected to significant liquid pressure. A passage 38 connects the chamber 27 with the inlet port 12. The pressure differential across the piston 26 which is exerted on the surface area of the piston 26 is the same as the liquid pressure at the inlet port 12. The resulting force urges the piston 26 towards the insert 19. When this liquid force exceeds the force exerted on the piston 26 by the spring 37, the piston 26 will move to unseat the ball 22, opening the pressure responsive valve 16. The amount the valve 16 is opened will depend on the liquid pressure at the inlet port 12. As the liquid pressure increases, the valve 16 will open further to dump more liquid to the by-pass port 14 and as the liquid pressure decreases the valve 16 will close further to dump less liquid to the by-pass port 14. The pressure responsive valve 16 will maintain a maximum liquid pressure in the chamber 18 which is determined by the setting of the pressure adjusting knob 15, the strength of the spring 37 and the size of the piston 26.

Figure 3:
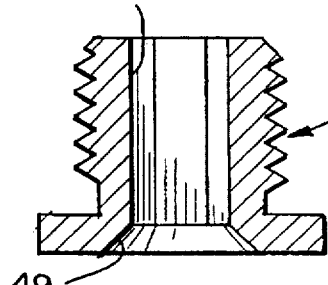
FIG. 3 is an enlarged cross sectional view showing details of the threaded insert for the flow responsive valve seat.

Liquid delivered to the chamber 18 is free to flow to a chamber 40 in a cylinder 41 in the housing 11. A piston 42 slides in the cylinder 41 and separates the chamber 40 from a chamber 43. The chamber 43 end of the cylinder 41 is closed by a plug 44. A guide rod 45 is secured to the piston 42 and extends through the plug 44. A seal 46 prevents liquid leakage between the rod 45 and the plug 44 without inhibiting the rod 45 from sliding in the plug 44. A threaded insert 47 is threaded into the housing 11 at the chamber 40 end of the cylinder 41. As best seen in FIG. 3, the insert 47 has a hexagonal opening 48 connecting the chamber 40 to the by-pass port 14. The hexagonal opening 48 is shaped to receive a complementary hexagonal wrench for attaching the insert 47 to the unloader housing 11. A conical or other suitably shaped seat 49 is formed around the opening 48 at the by-pass port 14 end of the opening 48.

Referring again to FIGS. 1 and 2, a rod 50 is connected to the piston 42 and extends through the hexagonal insert opening 48. The rod 50 is smaller than the opening 48 to allow liquid to flow through from the chamber 40 through the opening 48 to the by-pass port 14. In the by-pass port 14, a valve member 51 is secured to a free end 52 of the rod 50 with a nut 53. The insert seat 49 and the valve member 51 form the flow responsive valve 17. When the piston 42 is located in a position away from the insert 46, the valve member 51 will engage the seat 49 to prevent fluid flow from the chamber 40 to the by-pass port 14. Movement of the piston 42 towards the insert 46 opens the flow responsive valve 17 to allow liquid to flow from the chamber 40 to the by-pass port 14, thereby dumping most of the fluid pressure in the chamber 40.

The piston 42 is free to slide in the cylinder 41 and is not subjected to any spring pressure. Consequently, it is not subject to significant wear during use. When fluid is flowing from the outlet port 13, the position of the piston 42 is determined by the forces exerted by pressurized liquid in the chambers 40 and 43 on opposite sides of the piston 42. The chamber 40 connects with a calibrated orifice 55 in an insert 56. The orifice 55 is directed at a venturi 57 in a fitting 58 which is threaded into the housing 11. The venturi 57 in turn connects to the outlet port 13. A small chamber 59 is formed between the orifice 55 and the venturi 57. When liquid flows from the chamber 40 through the orifice 55, the chamber 59, the venturi 57 and the outlet port 13, the liquid pressure in the chamber 59 will be less than the liquid pressure in the chamber 40 due to the flow resistance of the orifice 55. A passage 60 connects the chamber 59 with the chamber 43. Consequently, when liquid is discharged from the outlet port 13, the pressure in the chamber 43 will be below the pressure in the chamber 40 and the piston 42 will be urged to a position wherein the flow responsive valve 17 is closed. It should be noted that with increased flow at the outlet port 13, the pressure drop across the orifice 55 will increase to increase the force holding the flow responsive valve 17 closed.

When flow from the outlet port 13 ceased, the static pressure in the chamber 43 will quickly build up until the pressures in the chambers 40 and 43 will be equal. However, the liquid in the chamber 40 is exerted through the insert opening 48 on the valve member 51. The high pressure acting on the valve member 51 creates a sufficient force to open the valve 17, pulling the piston towards the insert 46. This in turn dumps the pressurized liquid in the chamber 40 to the by-pass port 14. So long as there is no flow at the outlet port 13, there is no force on the piston 42 which would close the valve 17.

While open, the flow responsive valve 17 provides a low flow resistance. Consequently, a low pressure will remain in the chamber 40. The actual pressure in the chamber 40 will depend on the fluid flow rate and the flow constriction at the open valve 17. For example, the flow responsive valve 17 may be designed to have a by-pass pressure of about 40 psi at a flow of 6 gallons per minute and a by-pass pressure of about 18 psi at a flow of 4 gallons per minute. When the device connected to the outlet port 13 is again triggered or opened to receive pressurized liquid, the low pressure in the chamber 40 will cause at least some of the liquid to flow through the outlet port 13. This again creates a reduced liquid pressure in the chamber 59 which is applied to the chamber 43 to move the piston 43, closing the flow responsive valve 17. As the valve 17 begins to close, the flow through the outlet port 13 increases and the reduced pressure in the chamber 43 increases to further close the flow responsive valve 17. Thus, the high liquid pressure will quickly return at the outlet port 13.

The unloader 10 has several advantages over prior art unloaders. When the outlet port 13 is open, all liquid will flow from the inlet port 12 to the outlet port 13 so long as the liquid pressure is no greater than that set by the pressure adjusting knob 15. If the pressure increases above the set pressure, the pressure responsive valve 16 will limit the pressure to the set pressure. When liquid flow from the outlet port 13 ceases, the pressure responsive valve 17 quickly reduces the pressure both at the outlet port 13 and at the inlet port 12 to a very low level. Consequently, the load on the pump is significantly reduced to reduce energy consumption and pump wear. Further, if the outlet port 13 is connected through a hose to a washer gun, the pressure in the hose and at the gun is reduced to a very low level when the gun is off for added safety. The flow responsive valve 17 does not create the high pressure surge which many prior art flow responsive valves create when flow from the outlet port ceases. The combination of separate pressure responsive and flow responsive valves into an unloader provides the advantages of both, provides less valve component wear, provides greater reliability and requires fewer parts than prior art flow responsive unloaders.

The unloader 10 has been described for use with a high pressure washer pump connected to a washer gun. It will be appreciated that the unloader may be adapted for use in other pressurized fluid applications. For example, the unloader may be adapted for use in a hydraulic system which has intermittent fluid flow. Or, the unloader may be adapted for use with a gas compressor of the type in which a positive displacement compressor is connected directly to a load without the use of an accumulator or compressed air tank. It will be appreciated that various modifications and changes may be made to the above described preferred embodiment of a flow responsive pressure regulating unloader without departing from the spirit and the scope of the following claims.

I claim:

1. A flow responsive pressure regulating fluid unloader comprising a housing having an inlet port, an outlet port and a by-pass port, means connecting said inlet port to said outlet port, pressure regulating valve means connected between said inlet port and said by-pass port and adapted to dump fluid supplied to said inlet port above a set pressure to said by-pass port, a second valve connected between said inlet port and said by-pass port, means for closing said second valve in response to fluid flow to said outlet port and for opening said second valve in response to the absence of fluid flow to said outlet port.

2. A flow responsive pressure regulating fluid unloader, as set forth in claim 1, and including a cylinder in said housing, and wherein said means for closing and opening said second valve includes a piston mounted to slide in said cylinder, said piston separating said cylinder into first and second fluid chambers, means connecting said piston to open said second valve when said piston is moved to a first position and to close said second valve when said piston is moved to a second position.

3. A flow responsive pressure regulating fluid unloader, as set forth in claim 2, and means connecting said inlet port to said first chamber and wherein said second valve is connected between said first chamber and said by-pass port.

4. A flow responsive pressure regulating fluid unloader, as set forth in claim 3, and wherein said means connecting said inlet port to said outlet port includes an orifice through which fluid flowing to said outlet port passes, said orifice having an inlet port side and an outlet port side, said orifice establishing a pressure drop in response to fluid flow from said outlet port, and wherein said means closing and opening said second valve includes a passage connected to apply fluid from said outlet port side of said orifice to said second chamber whereby the fluid pressure in said second chamber is less than the fluid pressure in said first chamber when fluid flows from said outlet port and the fluid pressures in said first and second chambers become equal when fluid flow from said outlet port ceases.

5. A flow responsive pressure regulating fluid unloader, as set forth in claim 4, and wherein said second valve is responsive to fluid pressure in said first chamber to urge said second valve open when the fluid pressures in said first and second chambers are equal.

6. A flow responsive pressure regulating fluid unloader, as set forth in claim 4, and wherein fluid flowing from said inlet port to said outlet port passes through said first chamber.

7. A flow responsive pressure regulating fluid unloader, as set forth in claim 2, and wherein said means for closing and opening said second valve includes means responsive to fluid flow from said outlet port for creating a sufficient fluid pressure differential between said first and second chambers to move said piston to said second position and to create a substantially balanced fluid pressure between said first and second chambers when fluid flow from said outlet port ceases.

8. A flow responsive pressure regulating fluid unloader, as set forth in claim 7, and wherein said second valve is responsive to fluid pressure in said first chamber to urge said second valve open when the fluid pressures in said first and second chambers are substantially equal.

9. A flow responsive pressure regulating fluid unloader comprising a housing having an inlet port, an outlet port and a by-pass port, means including an orifice connecting said inlet port to said outlet port and wherein a pressure drop occurs across said orifice in response to fluid flow from said inlet port to said outlet port, pressure regulating valve means connected between said inlet port and said by-pass port and adapted to dump fluid at said inlet port above a set pressure to said by-pass port, a second valve connected between said inlet port and said by-pass port, means for closing said second valve in response to a pressure drop across said orifice and for opening said second valve in response to the absence of a pressure drop across said orifice.

* * * * *